Patented Feb. 26, 1929.

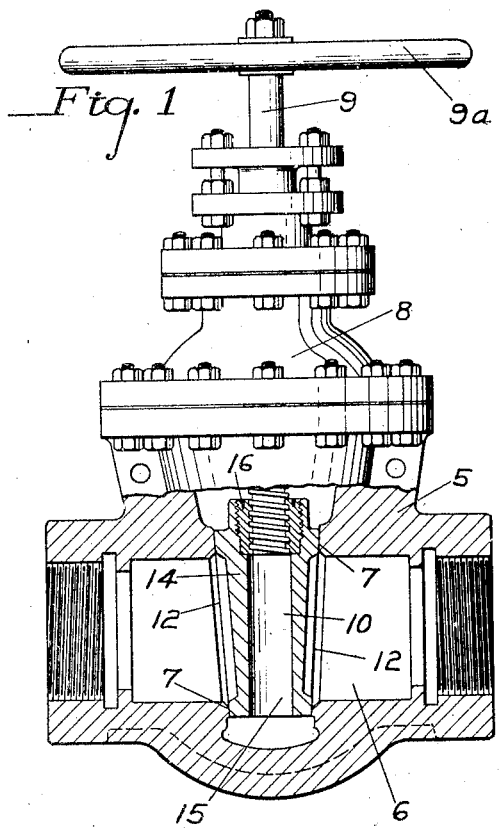
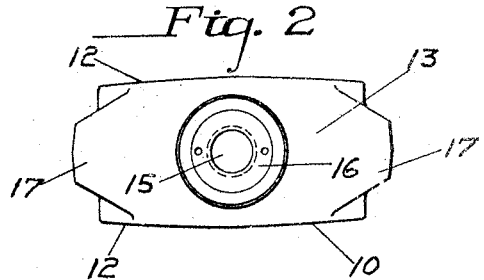
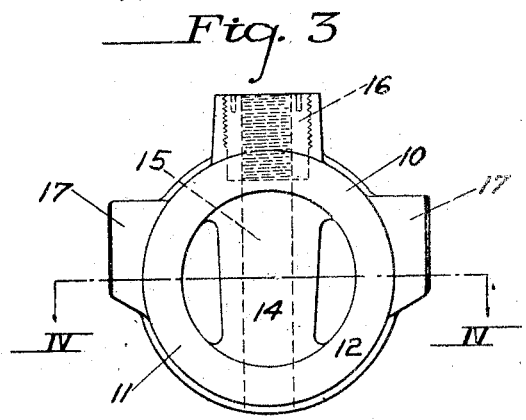
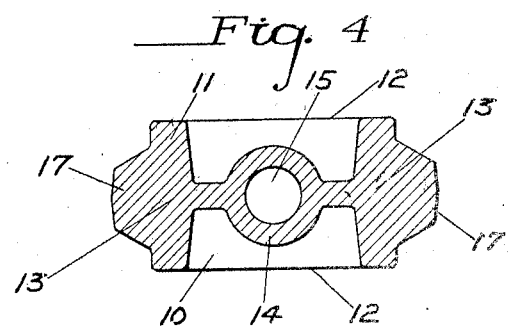
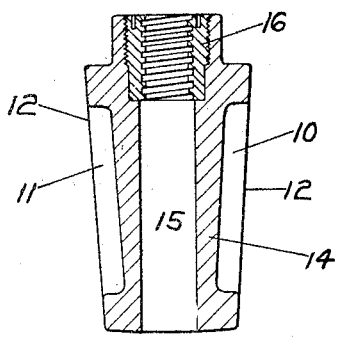

1,703,161

UNITED STATES PATENT OFFICE.

RICHARD W. MUELLER, OF PITTSBURGH, PENNSYLVANIA, ASSIGNOR, BY MESNE ASSIGNMENTS, TO KEROTEST MANUFACTURING COMPANY, OF PITTSBURGH, PENNSYLVANIA, A CORPORATION OF PENNSYLVANIA.

VALVE AND VALVE GATE THEREFOR.

Application filed January 21, 1924. Serial No. 687,405.

This invention is for an improvement in gate valves, and particularly valves of the kind shown in my copending application Serial No. 630,051, filed April 5, 1923.

In my application as above noted, I have described a cast steel valve body having integral valve seats and a cast steel gate slidable therein. Due to imperfections in the castings, the valve gates, which must have very accurately machined faces, frequently have to be discarded.

The present invention has for its principal object to provide a forged steel gate. Such a gate is not only free of the imperfections inherent in the cast steel gate, but is of greater strength, is cheaper, and cooperates more satisfactorily with the cast steel valve seats than does the cast steel gate.

My invention may be readily understood by reference to the accompanying drawings, in which:

Fig. 1 is a side elevation, partly in section, of a drilling valve of the type shown in my said application, having my improved gate therein;

Fig. 2 is a top view of the gate;

Fig. 3 is a front elevation of the gate;

Fig. 4 is a transverse horizontal section in the plane of line IV—IV of Fig. 3; and Fig. 5 is a transverse vertical section in the plane of line V—V of Fig. 3.

In the drawings, 5 designates a valve body having a passage 6 therein. This body is made of cast steel, and has integral or inserted seats at 7, which are set well back from the valve passage. The bonnet of the valve is designated 8 and through this passes valve stem 9, on the upper end of which is a hand wheel 9ª and the lower end of which has a threaded engagement with the valve gate 10.

The valve gate 10, which is a drop forging, has an annular flanged part 11, the opposite faces 12 of which are machined to cooperate with the valve seat to seal the valve. Within the flanged peripheral portion is a solid metal web or wall 13, in which there may be a vertical diametrically extending enlargement or rib 14 through which is drilled a hole 15. The top of the hole is of increased diameter, and threaded therein is a bushing 16 which is interiorly threaded for cooperation with the threaded valve stem. Projecting from the sides of the gate are lugs 17 which cooperate with the usual guideways, not shown, in the valve casing.

The gate as thus designed is solid, except for the bore 15. Due to the flanged shape of the peripheral portion, those surfaces 12 designed to cooperate with the valve seats, project beyond the surface of the central part 13 of the gate. The sides of the flange, at opposite sides of the web being tapered as shown, the taper of the periphery of the flange being in opposite directions to facilitate the removal of the gate from the die in which it is formed. The forged steel of the gate, furthermore, cooperates to better advantage with the cast steel valve seats than does a cast steel gate, the different metals sliding over each other to better advantage. The gate is especially useful in large, high pressure lines, and in drilling valves for oil or gas wells.

I claim as my invention:

1. The combination with a cast steel valve casing having a passage therethrough and having valve seats therein, of a drop-forged steel gate having projecting faces thereon machined for direct sealing cooperation with said valve seats.

2. A drop forged steel valve gate comprising an integral body having a central web, an annular flange extending beyond both side faces of the web, the sides of the flanges being machined for direct sealing engagement with a valve seat, the inner wall of the flange inclining outwardly in opposite directions from the plane of the central web, and a diametrically extending rib integral with and projecting from each face of the web and disposed inwardly of the sides of the flange, said rib extending above the flange to form a boss for coaction with adjusting-screw means, said gate having a diametrical opening therethrough in the diameter of the boss to accommodate a valve stem.

In testimony whereof I affix my signature.

RICHARD W. MUELLER.